June 16, 1931.　　　G. KLEMPP　　　1,810,050
ROLLING PIN
Filed Aug. 20, 1930
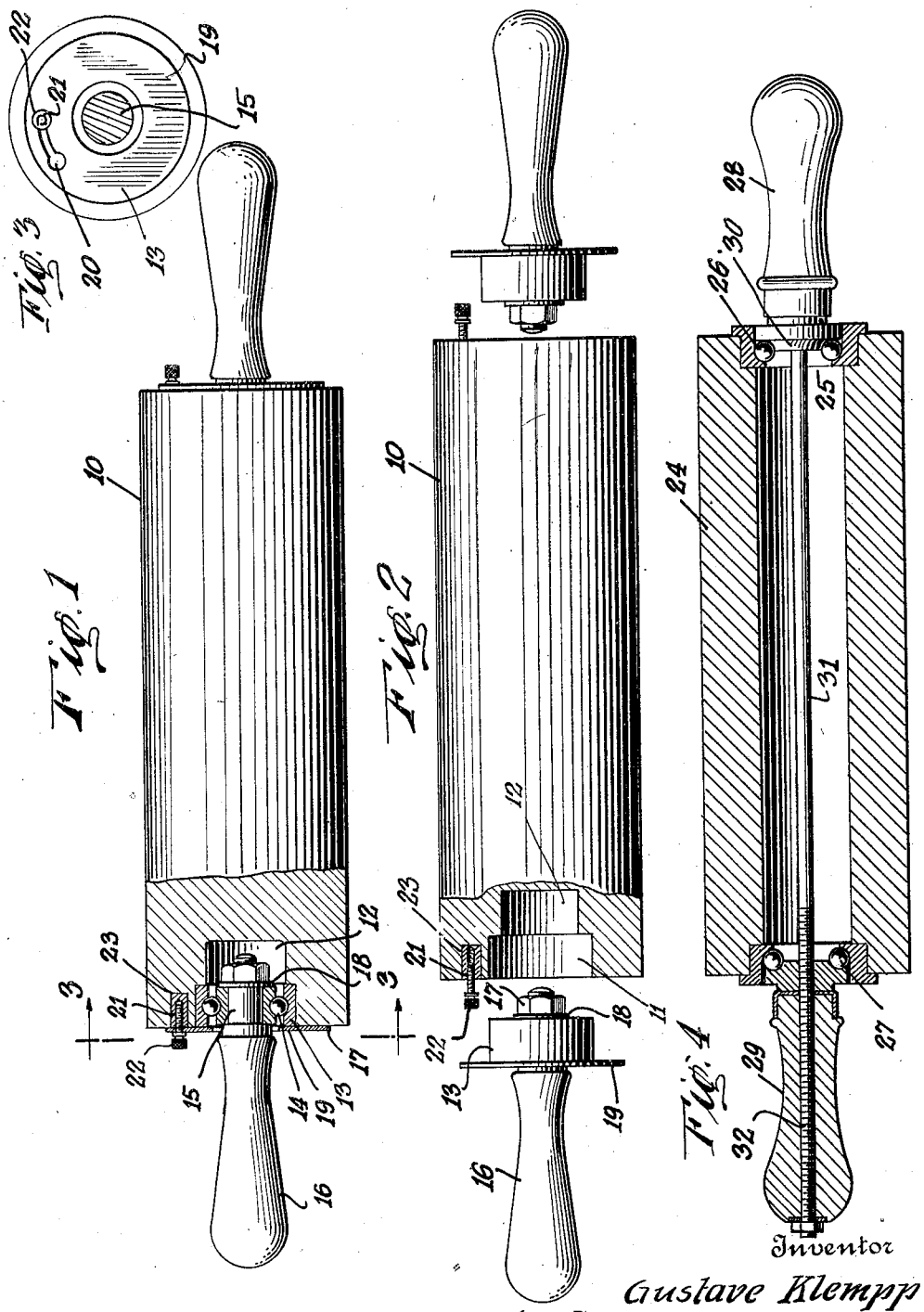
Inventor
Gustave Klempp
By his Attorney Patented June 16, 1931

1,810,050

UNITED STATES PATENT OFFICE

GUSTAVE KLEMPP, OF GLENWOOD, IOWA

ROLLING PIN

Application filed August 20, 1930. Serial No. 476,570.

This invention relates to improvements in rolling pins and its main object is to provide a pin the handles of which are readily detachable from the rolling pin for cleaning purposes and are equipped with means for reducing the friction during the use of the pin to a minimum.

Another object of my invention is the provision of a rolling pin equipped with removable handles and provided with means for quickly attaching and detaching said handles to the roller the ends of which are suitably chambered.

A further object of my invention is the provision of a rolling pin of comparatively simple and inexpensive construction, yet durable and efficient in operation.

A still further object of my invention is the provision of a rolling pin the handles of which are connected by a rod extending through the roller in the direction of its longitudinal axis carrying the handles, while suitable ball bearings are provided to reduce the friction during the operation of the pin to a minimum.

These and other objects and advantages of my invention will become more fully known as the description thereof proceeds and will then be specifically defined in the appended claims.

In the accompanying drawings forming a material part of this disclosure:

Fig. 1 is a side elevation of a rolling pin constructed according to my invention, part of the outer mantle being broken away at one end to better illustrate the interior construction.

Fig. 2 is a view similar to Figure 1 with the handles separated from the pin.

Fig. 3 is an end view seen in the direction of arrows 3—3 of Figure 1.

Fig. 4 is a longitudinal section through a modified form of roller-pin.

As shown in Figures 1 to 3, the cylindrical roller 10, preferably made of wood, has its ends chambered, as at 11 and 12.

Each chamber 11 is adapted to receive a housing 13 for a roller bearing 14, on the spindle 15 of a handle 16, and the end of the spindle extends into chamber 12 and is threaded for the reception of a nut 17 engaging a washer 18.

The outer end of housing 13 is closed by a flanged plate 19 provided with an arcuate slot 20 in which a screw bolt 21 is adjustable the outer end of which carries a head 22 while its inner end is threaded into a threaded member 23 formed in the roller 10.

The operation of my device will be entirely clear from the illustration and description, and it will be evident that by inserting housings 13 and nut 17 into chambers 11 and 12 respectively and screwing the bolt 21 home the handles are secured to the roller.

In the form of my invention illustrated in Figure 4, the roller 24 preferably made of hard wood or the like is hollow to form a longitudinally extending chamber 25 the open ends of which are adapted to receive ball bearings 26, 27, for the inner ends of the wooden handles 28, 29, provided with suitable ball races 30.

A rod 31 preferably made of steel extends through the middle axis of the roller pin and has threaded ends 32 on which the handles 28, 29, are screwed.

The operation of this form is so simple that it need not further be described.

It will be clear that I may make such changes in my rolling pin as come within the scope of the appended claims without departure from the spirit of my invention.

Having thus described my invention, what I claim as new and desire to secure by Letters Patent is:

1. In a rolling-pin of the class described having end chambers formed therein, handles, spindles for said handles, roller bearings on said spindles, casings for said bearings, nuts on the inner ends of said spindles in said chambers, and means for removably attaching said casings to the rolling-pin.

2. In a rolling-pin a roller having chambered ends, handles having spindles formed therewith, casings in said chambers, including ball races for said spindles, nuts at the inner ends of said spindles in said chambers, a flanged front plate for each of said casings having an arcuate slot and a screw bolt passing with play through said slot and extending with its threaded end into a threaded member in the material of said roller for detachably securing said handles to said roller.

3. A rolling-pin comprising a cylindrical roller having chambered ends, a housing for a roller bearing in each end chamber, handles, spindles formed with said handles in said roller bearings, extending into said chamber, nuts on the threaded ends of said spindles in said chamber engaging washers, flanged plates provided with arcuate slots closing the outer ends of said housings, screw bolts adjustable in said arcuate slots, threaded members formed in the roller into which the inner ends of said screw bolts engage, and outer heads on said bolts.

In witness whereof I have signed my name to this specification.

GUSTAVE KLEMPP.